(12) United States Patent
Maeda et al.

(10) Patent No.: US 11,145,853 B2
(45) Date of Patent: Oct. 12, 2021

(54) SECONDARY BATTERY AND METHOD FOR MANUFACTURING SECONDARY BATTERY

(71) Applicant: Envision AESC Japan Ltd., Zama (JP)

(72) Inventors: Takehiro Maeda, Kanagawa (JP); Yoshinori Naruoka, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 91 days.

(21) Appl. No.: 16/483,677

(22) PCT Filed: Mar. 7, 2017

(86) PCT No.: PCT/JP2017/009064
§ 371 (c)(1),
(2) Date: Aug. 5, 2019

(87) PCT Pub. No.: WO2018/163295
PCT Pub. Date: Sep. 13, 2018

(65) Prior Publication Data
US 2020/0020928 A1   Jan. 16, 2020

(51) Int. Cl.
*H01M 4/134* (2010.01)
*H01M 4/38* (2006.01)
(Continued)

(52) U.S. Cl.
CPC ........... *H01M 4/134* (2013.01); *H01M 4/139* (2013.01); *H01M 4/386* (2013.01); *H01M 4/622* (2013.01);
(Continued)

(58) Field of Classification Search
CPC ..... H01M 2004/021; H01M 2004/027; H01M 4/134; H01M 4/139; H01M 4/386; H01M 4/622
See application file for complete search history.

(56) References Cited

U.S. PATENT DOCUMENTS 6,908,711 B2 * 6/2005 Fauteux ............ H01M 10/0481
429/231.95
2010/0285367 A1 * 11/2010 Matsui .............. H01M 10/0525
429/231.95
(Continued)

FOREIGN PATENT DOCUMENTS

EP   2 421 080 A2   2/2012
EP   2 924 778 A1   9/2015
(Continued)

*Primary Examiner* — Matthew J Merkling
(74) *Attorney, Agent, or Firm* — Global IP Counselors, LLP

(57) ABSTRACT

A secondary battery includes a power generation element that includes a positive electrode having a collector on which a positive electrode active material layer is disposed, an electrolyte layer for retaining an electrolyte, and a negative electrode having a collector on which a negative electrode active material layer is disposed. The negative electrode active material layer has an area greater than that of the positive electrode active material layer. The negative electrode active material layer has a facing portion that faces a positive electrode active material layer with an electrolyte layer interposed by therebetween, and a non-facing portion that is positioned on an outer periphery of the facing portion and does not face the positive electrode active material layer. The non-facing portion has a stretching rate that is less than a stretching rate of the facing portion.

14 Claims, 8 Drawing Sheets

(51) Int. Cl.
*H01M 4/62* (2006.01)
*H01M 4/02* (2006.01)
*H01M 4/139* (2010.01)

(52) U.S. Cl.
CPC ................. *H01M 2004/021* (2013.01); *H01M 2004/027* (2013.01)

(56) References Cited

U.S. PATENT DOCUMENTS

| | | | | |
|---|---|---|---|---|
| 2012/0237821 | A1* | 9/2012 | Mitsuhashi | H01M 4/0404 |
| | | | | 429/211 |
| 2013/0196226 | A1* | 8/2013 | Lee | H01M 4/02 |
| | | | | 429/211 |
| 2013/0309569 | A1* | 11/2013 | Tsujiko | H01M 10/0431 |
| | | | | 429/211 |
| 2015/0303468 | A1* | 10/2015 | Kamo | H01M 4/483 |
| | | | | 429/213 |
| 2015/0325838 | A1* | 11/2015 | Tamaki | B60L 50/64 |
| | | | | 429/94 |
| 2016/0156015 | A1* | 6/2016 | Miura | H01M 4/0404 |
| | | | | 34/329 |
| 2019/0267611 | A1* | 8/2019 | Fukutomi | H01M 10/0587 |

FOREIGN PATENT DOCUMENTS

| | | |
|---|---|---|
| EP | 2 980 911 A1 | 2/2016 |
| JP | 2008-16210 A | 1/2008 |
| JP | 2011-154901 A | 8/2011 |
| JP | 2012-185913 A | 9/2012 |
| JP | 2014-207201 A | 10/2014 |

* cited by examiner

SECONDARY BATTERY AND METHOD FOR MANUFACTURING SECONDARY BATTERY

CROSS-REFERENCE TO RELATED APPLICATIONS

This application is a U.S. national stage application of International Application No. PCT/JP2017/009064, filed on Mar. 7, 2017.

BACKGROUND

Technical Field

The present invention relates to a secondary battery and a method for manufacturing a secondary battery.

Background Information

A secondary battery has at least one power generation element. The power generation element has a positive electrode having a collector on which a positive electrode active material layer is disposed, an electrolyte layer for retaining an electrolyte, and a negative electrode having a collector on which a negative electrode active material layer is disposed. The positive electrode active material layer and the negative electrode active material layer face each other, interposed by the electrolyte layer. Therefore, there is a concern that when, for example, positional deviation of the positive electrode active material layer relative to the negative electrode active material layer occurs in relation to a horizontal direction that intersects a stacking direction, a facing area over which the positive electrode active material layer and the negative electrode active material layer face each other could change, resulting in fluctuation of power generation capacity.

Therefore, adopting a configuration such that an area of the negative electrode active material layer is greater than an area of the positive electrode active material layer suppresses the effect of positional deviation on the facing area and prevents fluctuation of the power generation capacity (for example, see Japanese Laid-Open Patent Application No. 2012-185913).

SUMMARY

However, a negative electrode active material layer has a facing portion that faces a positive electrode active material layer, interposed by an electrolyte layer, and a non-facing portion that is positioned on an outer periphery of the facing portion and does not face the positive electrode active material layer. In this case, expansion and contraction of the negative electrode that corresponds to the facing portion is restricted by the positive electrode active material layer and the electrolyte layer, and therefore is suppressed. However, expansion and contraction of the negative electrode that corresponds to the non-facing portion is not restricted, and therefore is not suppressed. Therefore, there is a concern that a difference in an expansion/contraction dimension will be formed between the negative electrode in a site that corresponds to the non-facing portion and the negative electrode in a site that corresponds to the facing portion due to expansion and contraction of the negative electrode active material layer during charging and discharging, and that wrinkling will occur in an outer peripheral edge portion of the negative electrode where the non-facing portion is positioned.

The wrinkling in the outer peripheral edge portion of the negative electrode grows due to repeated charging and discharging, reaches the facing portion, i.e., a site where electrode reactions occur, and causes a distance between the electrodes nonuniform (reduces battery performance). As a result, cycle characteristics (service life) could be adversely affected.

The present invention was contrived in view of the above-mentioned problem. An object of the present invention is to provide a secondary battery in which wrinkling in an outer peripheral edge portion of a negative electrode that is caused by expansion and contraction of a negative electrode active material layer can be suppressed, and to provide a method for manufacturing a secondary battery.

One aspect of the present invention designed to achieve the above-mentioned object is a secondary battery in which a negative electrode active material layer has a facing portion that faces a positive electrode active material layer with an electrolyte layer interposed therebetween, and a non-facing portion that is positioned on an outer periphery of the facing portion and does not face the positive electrode active material layer, the secondary battery being configured so that an expansion rate, which is a volume increase rate in volume per unit of the negative electrode active material layer during charging and discharging, is lower in the non-facing portion than in the facing portion.

Another aspect of the present invention designed to achieve the above-mentioned object is a method for manufacturing a secondary battery, the method having an expansion rate control step in which an expansion rate of a negative electrode active material layer in a non-facing portion is made less than an expansion rate of the negative electrode active material layer in the facing portion.

In a secondary battery according to the present invention, because an expansion rate of a negative electrode active material layer in a non-facing portion is less than an expansion rate of the negative electrode active material layer in a facing portion, it is possible to minimize the incidence of a difference in an expansion/contraction dimension between a negative electrode corresponding to the facing portion and the negative electrode corresponding to the non-facing portion during expansion and contraction of the negative electrode active material layer (during charging and discharging) to a greater extent than in a case where the expansion rate of the non-facing portion and the expansion rate of the facing portion are the same. Therefore, wrinkling in an outer peripheral edge portion of the negative electrode at which the non-facing portion is positioned is suppressed. Specifically, it is possible to provide a secondary battery in which wrinkling in an outer peripheral edge portion of the negative electrode that is caused by expansion and contraction of the negative electrode active material layer can be suppressed, and to provide a method for manufacturing a secondary battery.

Additional objects, characteristics, and features of the present invention will be clarified by reference to preferred embodiments exemplified by the explanations and accompanying drawings that follow.

DETAILED DESCRIPTION OF THE EMBODIMENTS

Figure 1:
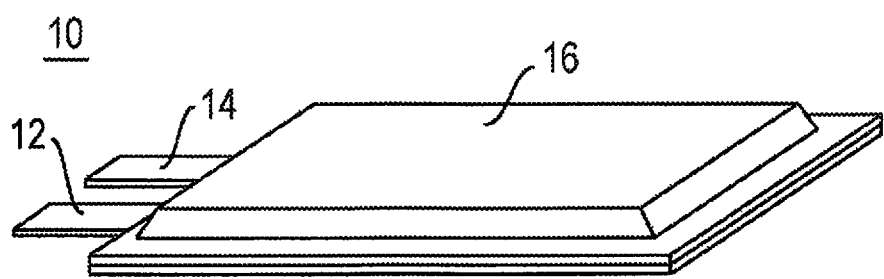
FIG. 1 is an oblique view illustrating a secondary battery according to an embodiment of the present invention.

Embodiments of the present invention are described below with reference to the accompanying drawings. Ratios of dimensions in the drawings are sometimes exaggerated for convenience of description, and may vary from actual ratios.

Figure 2:
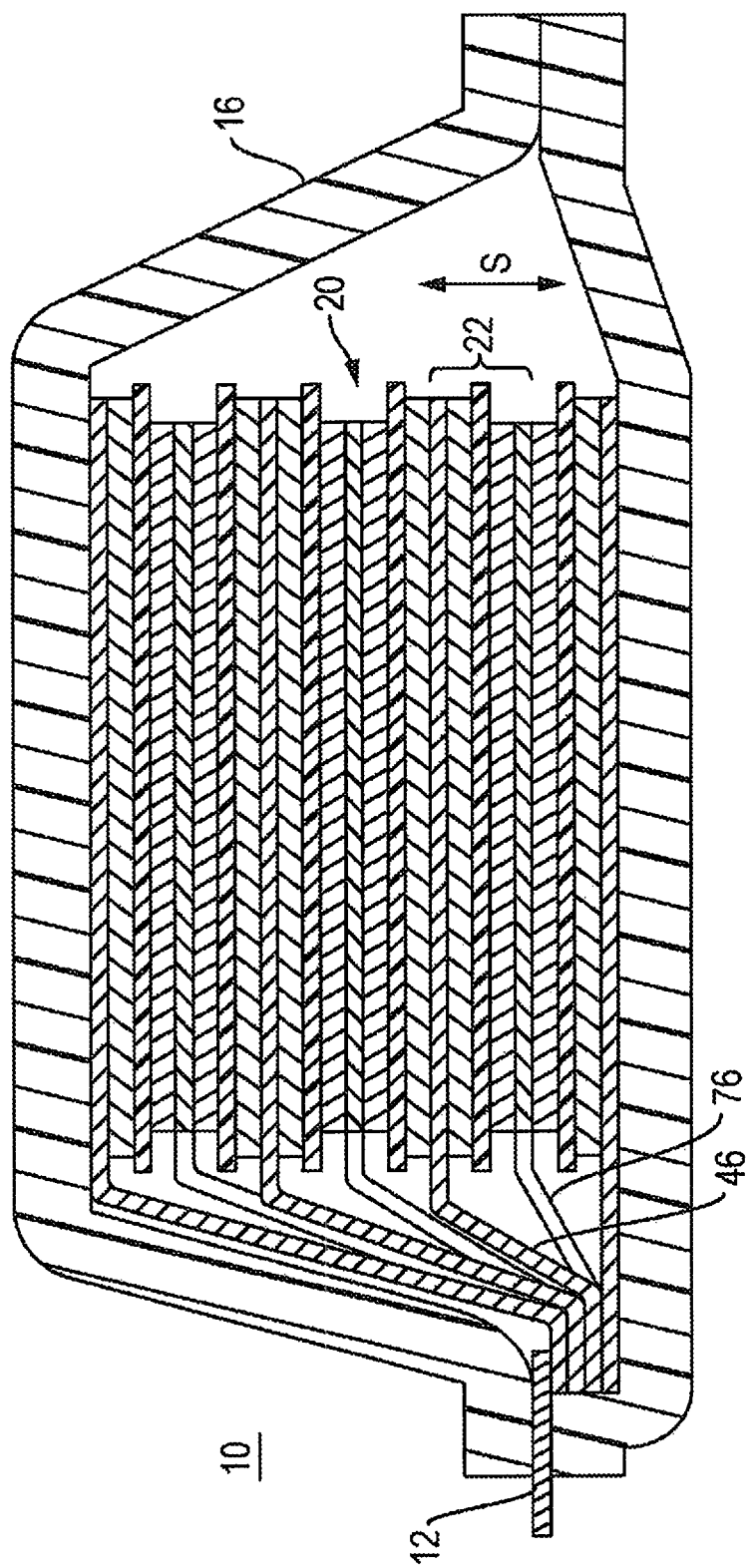
FIG. 2 is a sectional view of the secondary battery shown in FIG. 1.

FIG. 1 is an oblique view illustrating a secondary battery according to an embodiment of the present invention, and FIG. 2 is a sectional view of the secondary battery shown in FIG. 1.

A secondary battery 10 according to an embodiment of the present invention is a non-bipolar lithium-ion secondary battery, and has a negative electrode tab 12, a positive electrode tab 14, and an exterior body 16, as shown in FIG. 1. The secondary battery 10 is, for example, formed into an assembled battery and used as a power supply device for a vehicle. The vehicle is, for example, an electric automobile or a hybrid electric automobile.

The negative electrode tab 12 and the positive electrode tab 14 are strong electric terminals composed of highly electroconductive members. The electrode tabs extend out from inside the exterior body 16 and are used in order to send out an electric current. The highly electroconductive members are, for example, aluminum, copper, titanium, nickel, stainless steel, or an alloy of these. The negative electrode tab 12 and the positive electrode tab 14 are preferably covered by, for example, a heat-resistant and insulating heat-shrinkable tubing, and are thereby reliably prevented from coming in electrical contact with peripheral equipment, wiring, etc.

As shown in FIG. 2, a battery body 20 is disposed inside the exterior body 16, and the exterior body 16 is used in order to prevent shock of external origin or environmental degradation. The exterior body 16 is formed by joining some or all of an external peripheral part of a sheet member. Examples of the joining method include thermal fusion bonding.

The sheet members are preferably constituted from a polymer-metal composite laminate film, for the sake of weight reduction and thermal conductivity. Examples of the polymer include polypropylene, polyethylene, and other such thermoplastic resin materials. The metal is, for example, aluminum, stainless steel, nickel, copper, etc. (including alloys of these). The exterior body 16 is not limited to being constituted from a pair of laminate films (sheet members); for example, a laminate film formed in a bag shape in advance can be used as well.

The battery body 20 has a plurality of power generation elements (unit cells) 22. The power generation elements 22 are stacked and electrically connected in parallel. Reference symbol S indicates a stacking direction of the power generation elements 22.

The battery body and the power generation elements are described in more detail below.

Figure 3:
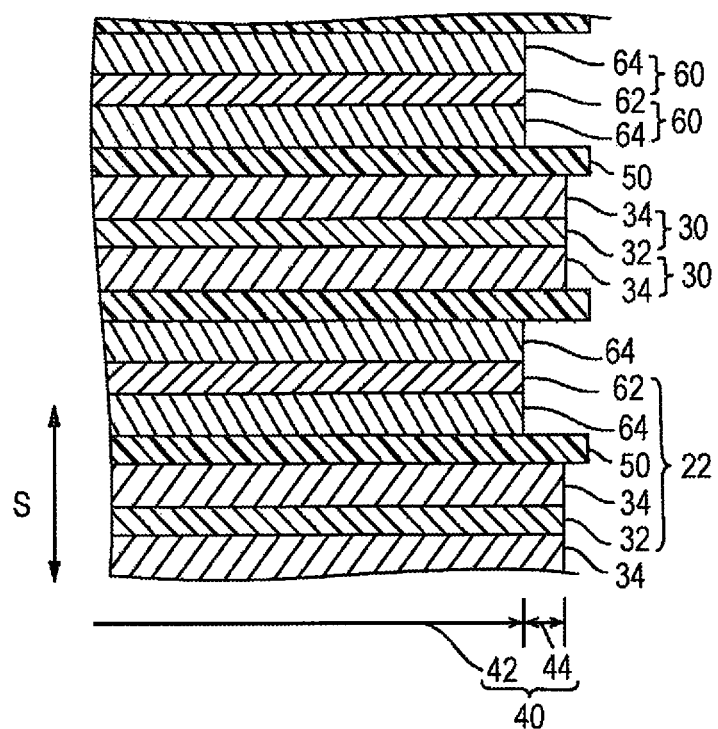
FIG. 3 is a sectional view illustrating a power generation element shown in FIG. 2.
Figure 4:
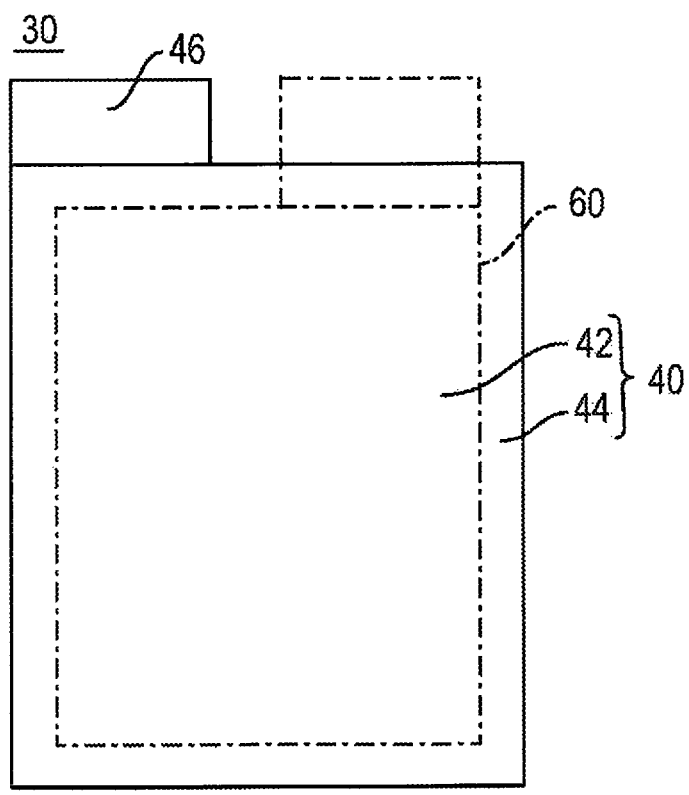
FIG. 4 is a plan view illustrating a negative electrode shown in FIG. 3.
Figure 5:
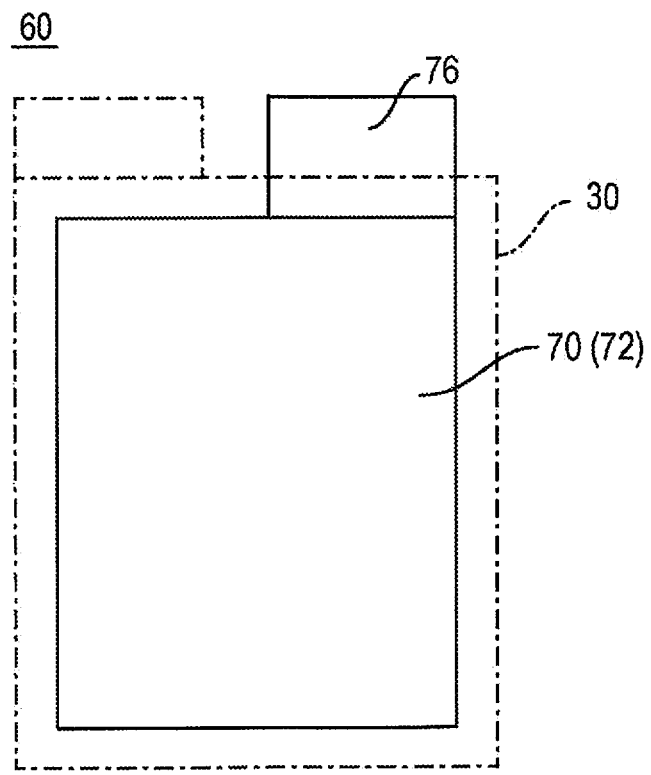
FIG. 5 is a plan view illustrating a positive electrode shown in FIG. 3.

FIG. 3 is a sectional view illustrating a power generation element shown in FIG. 2, FIG. 4 is a plan view illustrating a negative electrode shown in FIG. 3, and FIG. 5 is a plan view illustrating a positive electrode shown in FIG. 3.

The battery body 20 has negative electrodes 30, separators 50, and positive electrodes 60, as shown in FIG. 3.

The negative electrodes 30 have a substantially rectangular collector 32 and a negative electrode active material layer 34. The negative electrode active material layer 34 is disposed on both surfaces of the collector 32 in the stacking direction S. In other words, the collector 32 is shared by adjacent negative electrodes 30.

The collector 32 has a thickness of, e.g., about 1-100 μm. A constituent material of the collector 32 is a metal or an electroconductive resin. Examples of the metal include aluminum, nickel, iron, stainless steel, titanium, copper, cladding materials of nickel and aluminum, cladding materials of copper and aluminum, and plating materials that are a combination of these metals. Examples of the electroconductive resin include electroconductive polymer materials, electroconductive polymer materials to which electroconductive filler has been added, and non-electroconductive polymers to which electroconductive filler has been added.

The negative electrode active material layers 34 have a thickness of, e.g., approximately 1-100 μm, and contains a negative electrode active material and additives. The negative electrode active material has a composition whereby lithium ions can be desorbed during discharging and lithium ions can be occluded during charging. The additives are a binder and an electroconductivity auxiliary. The binder is added for the purpose of maintaining a negative electrode structure, and has a function for bonding together the constituent materials of the negative electrode active material layers 34 and a and a function for causing the negative electrode active material layers 34 to bind to the collector 32. The electroconductivity auxiliary is blended in order to enhance the electroconductivity of the negative electrode active material layers 34.

The positive electrodes 60 have a substantially rectangular collector 62 and positive electrode active material layers 64. The positive electrode active material layers 64 are disposed on both surfaces of the collector 62 in the stacking direction S. Specifically, the collector 62 is shared by adjacent positive electrodes 60.

The collector 62 has a thickness of, e.g., approximately 1-100 μm. A constituent material of the collector 62 is the same as the constituent material of the collector 32 of the negative electrode 30.

The positive electrode active material layer 64 has a thickness of, e.g., approximately 1-100 μm, and contains a positive electrode active material and additives. The positive electrode active material has a composition whereby lithium ions can be released during charging and lithium ions can be occluded during discharging. The additives include a binder and an electroconductivity auxiliary. The binder is added for the purpose of maintaining the structure of the positive electrode, and has a function for bonding together the constituent materials of the positive electrode active material layer 64 and a function for bonding the positive electrode active material layer 64 to the collector 62. The electroconductivity auxiliary is blended in order to improve the electroconductivity of the positive electrode active material layer 64.

The separator 50 is substantially rectangular and has a thickness of, e.g., approximately 1-50 μm. The separator 50 constitutes part of an electrolyte layer in which an electrolyte is retained (the electrolyte layer being impregnated with an electrolyte), and is disposed between the negative electrode active material layer 34 and the positive electrode active material layer 64 (the negative electrode active material layer 34 and the positive electrode active material layer 64 face each other, interposed by the separator 50). Specifically, the separator 50 has a function for ensuring the conductivity of lithium ions (carrier ions) between the positive electrode 60 and the negative electrode 30, and a function for acting as a partition wall between the positive electrode 60 and the negative electrode 30.

The power generation elements 22 are each configured from the collector 32 on which the negative electrode active material layer 34 is disposed, the negative electrode active material layer 34, the separator 50, the positive electrode active material layer 64, and the collector 62 on which the positive electrode active material layer 64 is disposed. Each of the collector 32 and the collector 62 is shared by adjacent power generation elements 22.

A configuration is adopted such that the area of the negative electrode active material layer 34 is greater than the area of the positive electrode active material layer 64. This suppresses any reduction in a facing area over which the negative electrode active material layer 34 and the positive electrode active material layer 64 face each other even when positional deviation of the positive electrode active material layer 64 relative to the negative electrode active material layer 34 occurs. Therefore, fluctuation of power generation capacity caused by a reduction in the facing area is prevented.

The collector 32 of the negative electrode 30 has an active-material region 40 and a non-active-material region 46, as shown in FIG. 4. The active-material region 40 has a facing portion 42 and a non-facing portion 44, the negative electrode active material layer 34 being disposed in the active-material region 40.

The facing portion 42 is a region that faces the positive electrode active material layer 64, interposed by the separator 50. The non-facing portion 44 is a region that is positioned on the outer periphery of the facing portion 42 (so as to surround the facing portion 42) and does not face the positive electrode active material layer 64.

The non-active-material region 46 is composed of a protrusion that protrudes from one side of the substantially rectangular active-material region 40, and is connected to the negative electrode tab 12 that is intended to send out an electric current to the outside (see FIG. 2).

The collector 62 of the positive electrode 60 has an active-material region 70 and a non-active-material region 76, as shown in FIG. 5. The active-material region 70 faces the negative electrode active material layer 34, interposed by the separator 50, the positive electrode active material layer 64 being disposed in the active-material region 70. Specifically, the active-material region 70 constitutes part of a facing portion 72.

The non-active-material region 76 is composed of a protrusion that protrudes from one side of the substantially rectangular active-material region 70, and is connected to the positive electrode tab 14 that is intended to send out an electric current to the outside (see FIG. 2). The non-active-material region 76 is positioned so as not to overlap the non-active-material region 46 of the collector 32 of the negative electrode 30 in the stacking direction S. A connection between the negative electrode tab 12 and the non-active-material region 46 of the collector 32, and a connection between the positive electrode tab 14 and the non-active-material region 76 of the collector 62, are formed by ultrasonic welding or resistance welding, for example.

The facing portion and the non-facing portion of the negative electrode active material layer are described in more detail below.

Figure 6:
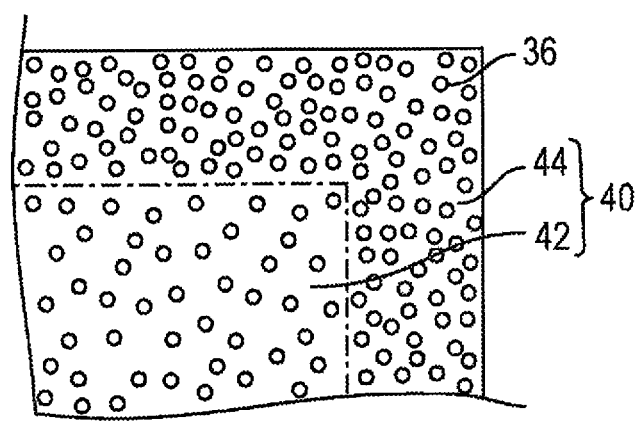
FIG. 6 is a plan view illustrating a facing portion and a non-facing portion of a negative electrode active material layer shown in FIG. 4.

FIG. 6 is a plan view illustrating a facing portion and a non-facing portion of a negative electrode active material layer shown in FIG. 4.

A configuration is adopted such that an expansion rate of the non-facing portion 44 is less than an expansion rate of the facing portion 42. The expansion rate is defined by a volume increase rate in volume per unit of the negative electrode active material layer 34 during discharging to a prescribed electricity quantity set in advance. Therefore, during expansion and contraction of the negative electrode active material layer 34 (during charging and discharging), stress acting on the negative electrode that corresponds to the non-facing portion 44 is reduced to a greater extent than in a case where the expansion rate of the non-facing portion 44 and the expansion rate of the facing portion 42 are the same.

Specifically, the positive electrode and the separator are stacked in a site that corresponds to the facing portion 42 of the negative electrode, and ordinarily, this site is pressed from above and below due to in the fact that pressure is reduced inside the exterior body, and expansion and contraction caused by expansion and contraction of the negative electrode active material layer during charging and discharging is suppressed. However, at least the facing positive electrode is not present in a site that corresponds to the non-facing portion 44 of the negative electrode, and this site is not pressed from above and below. Therefore, expansion and contraction caused by expansion and contraction of the negative electrode active material layer during charging and discharging is not suppressed. Therefore, in a case where the expansion rate of the negative electrode active material layer at the non-facing portion 44 and the expansion rate of the negative electrode active material layer at the facing portion 42 are the same, the expansion/contraction dimension of the negative electrode at the facing portion 42 is less than the expansion/contraction dimension of the negative electrode that at the non-facing portion 44, and stress acts on the non-facing portion 44 due to the difference in expansion/contraction dimension. Therefore, adopting a configuration such that the expansion rate of the negative electrode active material layer at the non-facing portion 44 is less than the expansion rate of the negative electrode active material layer at the facing portion 42 makes it possible to minimize the incidence of a difference between the expansion/contraction dimension of the negative electrode at the facing portion 42 and the expansion/contraction dimension of the negative electrode at the non-facing portion 44, and to reduce the stress acting on the non-facing portion 44 due to the difference in expansion/contraction dimension.

As a result, wrinkling in the outer peripheral edge portion of the negative electrode 30 at which the non-facing portion 44 is positioned is suppressed. This hinders wrinkling in the outer peripheral edge portion of the negative electrode from growing due to repeated charging and discharging, and also hinders such wrinkling from reaching the facing portion, i.e., a site where electrode reactions occur. Therefore, adverse effects on cycle characteristics (service life) are suppressed, said adverse effects being based on making a distance between the electrodes nonuniform (reducing battery performance). Specifically, because the uniformity of the inter-electrode distance is maintained, it is possible to improve cycle characteristics.

In the present embodiment, as shown in FIG. 6, the non-facing portion 44 and the facing portion 42 have holes 36, and the hole ratio in the non-facing portion 44 is greater than the hole ratio in the facing portion 42. Therefore, it is possible to ensure that the amount of space contained within the negative electrode active material being expanded is greater in the non-facing portion 44 than in the facing portion 42. Specifically, a configuration in which the expansion rate of the non-facing portion 44 is made less than the expansion rate of the facing portion 42 is readily achieved by controlling the hole ratio. As an example, the hole ratio in the non-facing portion 44 is 40%, and the hole ratio in the facing portion 42 is 30%.

Removing the binder included in the non-facing portion 44 increases the hole ratio in the non-facing portion 44. Therefore, the weight of the binder per unit volume in the non-facing portion 44 is made less than the weight of the binder per unit volume in the facing portion 42.

More specifically, the binder is an aqueous binder in which water is a solvent or a dispersion medium, and the binder includes a rubber-based binder and a water-soluble polymer binder. A thermal decomposition temperature of the rubber-based binder is set so as to be higher than a thermal decomposition temperature of the water-soluble polymer binder, and the water-soluble polymer binder included in the non-facing portion 44 is removed. Specifically, the weight of the water-soluble polymer binder per unit volume in the non-facing portion 44 is made less than the weight of the water-soluble polymer binder per unit volume in the facing portion 42.

The negative electrode active material, the negative electrode binder, the positive electrode active material, the positive electrode binder, the electroconductivity auxiliary, the material properties of the separator, etc., are described below in the stated order.

The negative electrode active material employed is of one or more types, as necessary. At least one of the negative electrode active materials is preferably configured from a silicon-based material. This is preferred because silicon has lithium ion absorption capabilities per unit volume superior to those of graphite, etc. Specifically, using a silicon-based material as a negative electrode active material makes it possible to increase the capacity of a secondary battery. In particular, in the present embodiment, it is easy to apply a silicon-containing negative electrode active material having a high expansion rate because wrinkling in the outer peripheral edge portion of the negative electrode is suppressed.

Examples of the silicon-based material include silicon metal (elemental Si), silicon alloys, silicon oxides, silicon compounds, and silicon semiconductors. The silicon alloy includes aluminum, tin, zinc, nickel, copper, titanium, vanadium, magnesium, lithium, or another such metal alloyed with silicon. The silicon alloy preferably is at least a ternary alloy, such as a Si—Sn—Ti-based alloy. The silicon oxide is $SiO_2$, SiO, SiOx, etc. SiOx is a mixture of amorphous $SiO_2$ particles and Si particles (x represents an oxygen number that satisfies the atomic valence of Si). The silicon compound contains at least one component selected from the group consisting of, for example, lithium, carbon, aluminum, tin, zinc, nickel, copper, titanium, vanadium, and magnesium.

The negative electrode binder employed is of one or more types, as necessary.

The negative electrode binder is preferably an aqueous binder in which water is a solvent or a dispersion medium. With an aqueous binder, not only is water readily procured as a raw material, but also water vapor is generated during drying. Therefore, the aqueous binder is preferred because it is possible to greatly reduce capital investment in a production line and also to reduce environmental burden.

The term "aqueous binder" includes all binders normally referred to as latexes or emulsions, and indicates a polymer emulsified with water or suspended in water. From the standpoint of bonding properties, a rubber-based binder is preferred. Examples of the rubber-based binder include styrene-butadiene rubber (SBR), acrylonitrile-butadiene rubber, methyl methacrylate-butadiene rubber, and methyl methacrylate rubber. Styrene-butadiene rubber (SBR) is particularly preferred due to having excellent bonding properties.

When styrene-butadiene rubber (SBR) is used as the aqueous binder, it is preferable that a water-soluble polymer binder be used in combination therewith as a second aqueous binder from the standpoint of improving coating properties. Examples of the water-soluble polymer include polyvinyl alcohol, modified polyvinyl alcohol, starches, modified starches, cellulose derivatives, polyvinyl pyrrolidone, polyacrylic acids (or salts thereof), and polyethylene glycol. The cellulose derivative is carboxymethylcellulose (CMC), methyl cellulose, hydroxyethyl cellulose, salts of these, etc. Salts of the carboxymethylcellulose (CMC) include carboxymethylcellulose ammonium salts, carboxymethylcellulose alkali metal salts, and carboxymethylcellulose alkali earth metal salts.

When the water-soluble polymer is combined with styrene-butadiene rubber, a carboxymethylcellulose-based compound is preferred. Examples of the carboxymethylcellulose-based compound include carboxymethylcellulose and salts thereof.

From the standpoint of capacity and output characteristics, the positive electrode active material is preferably a lithium-transition metal composite oxide. Examples of the lithium-transition metal composite oxide include lithium-transition metal oxides, $LiMPO_4$ (M=Fe, Mn, Co, or Ni) and other such lithium-transition metal phosphate compounds, and lithium-transition metal sulfate compounds. The lithium-transition metal oxides are $LiMn_2O_4$ and other such Li—Mn-based composite oxides, $LiNiO_2$ and other such Li—Ni-based composite oxides, $LiNi_{0.5}Mn_{0.5}O_2$ and other such Li—Ni—Mn-based composite oxides, $LiCoO_2$ and other such Li—Co-based composite oxides, $LiFeO_2$ and other such Li—Fe-based composite oxides, etc.

The positive electrode active material preferably is configured from one or more materials selected from the group consisting of Ni-based materials, ternary materials, and olivine-based materials. The Ni-based materials are $LiNiO_2$, materials in which some of $LiNiO_2$ is replaced by a transition metal, etc. Examples of materials in which some of $LiNiO_2$ is replaced by a transition metal include $LiNiCoO_2$, $LiNiMnO_2$, $LiNiMnCoO_2$, $LiNiCoAlO_2$, and $LiNiCoAlMO_2$. The ternary materials are, inter alfa, $LiNi_{1/3}Mn_{1/3}Co_{1/3}O_2$ in which the ratio of Ni, Mn, and Co is 1:1:1. The olivine-based materials are $LiMPO_4$ (M=Fe, Mn, Co, or Ni), represented by $LiFePO_4$.

The positive electrode binder employed is of one or more types, as necessary. Examples of the positive electrode binder include: polyethylene, polypropylene, polyethylene terephthalate (PET), polyether nitrile, polyacrylonitrile, polyimide, polyamide, cellulose, carboxymethylcellulose (CMC), and salts thereof; ethylene-vinyl acetate copolymers, polyvinyl chloride, styrene-butadiene rubber (SBR), isoprene rubber, butadiene rubber, ethylene-propylene rubber, ethylene-propylene-diene copolymers, styrene-butadiene-styrene block copolymers, and hydrogenated products thereof; styrene-isoprene-styrene block copolymers and hydrogenated products thereof; and fluororesins, fluororubbers, and epoxy resins.

The fluororesins are polyvinylidene fluoride (PVdF), vinylidene-fluoride-based copolymers (modified PVdF), polytetrafluoroethylene (PTFE), tetrafluoroethylene-hexafluoropropylene copolymers (FEP), tetrafluoroethylene-perfluoroalkyl vinyl ether copolymers (PFA), ethylene-tetrafluoroethylene copolymers (ETFE), polychlorotrifluoroethylene (PCTFE), ethylene-chlorotrifluoroethylene copolymers (ECTFE), polyvinyl fluoride (PVF), etc.

The fluororubbers are vinylidene fluoride-hexafluoropropylene-based fluororubbers (VDF-HFP-based fluororubbers), vinylidene fluoride-hexafluoropropylene-tetrafluoroethylene-based fluororubbers (VDF-HFP-TFE-based fluororubbers), vinylidene fluoride-pentafluoropropylene-based fluororubbers (VDF-PFP-based fluororubbers), vinylidene fluoride-pentafluoropropylene-tetrafluoroethylene-based fluororubbers (VDF-PFP-TFE-based fluororubbers), vinylidene fluoride-perfluoromethyl vinyl ether-tetrafluoroethylene-based fluororubbers (VDF-PFMVE-TFE-based fluororubbers), vinylidene fluoride-chlorotrifluoroethylene-based fluororubbers (VDF-CTFE-based fluororubbers), etc.

The electroconductivity auxiliary is configured from, for example, a carbon material having excellent electroconductivity. The carbon material is a carbon powder, vapor-grown carbon fibers (VGCF®) and other such carbon fibers, exfoliated graphite, etc. Examples of the carbon powder include carbon black, channel black, thermal black, and graphite. The carbon black is acetylene black, ketjen black, furnace black, etc.

The separator is configured from: a porous sheet, which is composed of fibers and a polymer for absorbing and retaining an electrolyte; a non-woven fabric sheet; etc.

Examples of the porous sheet include microporous (microporous membrane) sheets. The microporous sheets are formed from polyolefins such as polyethylene and polypropylene, layered forms in which a plurality of polyolefins are stacked, polyimides, aramids, polyvinylidene fluoride-hexafluoropropylene (PVdF-HFP), glass fibers, etc. Examples of the layered forms include layered forms having three-layer structures composed of polypropylene/polyethylene/polypropylene.

The non-woven fabric sheet is formed from, for example, cotton, rayon, acetate, Nylon®, polyester, polyolefins such as polyethylene and polypropylene, polyimides, or aramids.

Examples of the electrolyte retained in the separator include liquid electrolytes and gel polymer electrolytes.

The liquid electrolytes are configured so that a lithium salt, which is a supporting salt, is dissolved by a solvent. Examples of the lithium salt include $Li(CF_3SO_2)_2N$, $Li(C_2F_5SO_2)_2N$, $LiPF_6$, $LiBF_4$, $LiAsF_6$, $LiTaF_6$, $LiClO_4$, and $LiCF_3SO_3$. Examples of the solvent include ethylene carbonate (EC), propylene carbonate (PC), butylene carbonate (BC), vinylene carbonate (VC), dimethyl carbonate (DMC), diethyl carbonate (DEC), ethylmethyl carbonate (EMC), and methylpropyl carbonate (MPC).

The gel polymer electrolytes are configured from a matrix polymer (host polymer) into which a liquid electrolyte is injected. The matrix polymer is an ion-conductive polymer. Examples of the matrix polymer include polyethylene oxide (PEO), polypropylene oxide (PPO), and copolymers thereof.

A method for manufacturing a secondary battery according to an embodiment of the present invention is described next.

Figure 7:
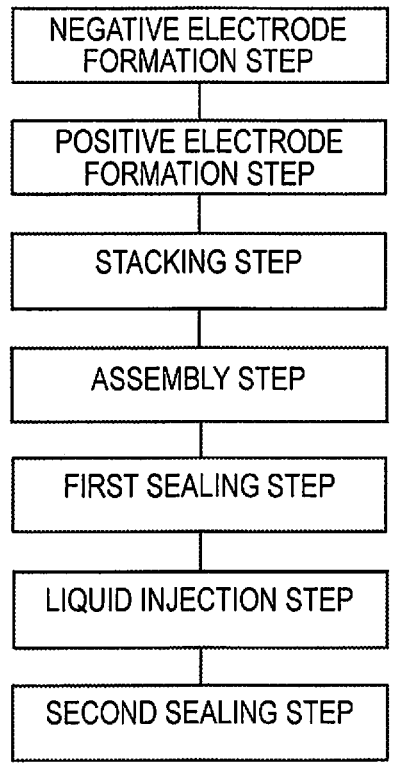
FIG. 7 is a flowchart for illustrating a method for manufacturing a secondary battery according to an embodiment of the present invention.

FIG. 7 is a flowchart for illustrating a method for manufacturing a secondary battery according to an embodiment of the present invention.

The method for manufacturing a secondary battery according to the present embodiment has a negative electrode formation step, a positive electrode formation step, a stacking step, an assembly step, a first sealing step, a liquid injection step, and a second sealing step, as shown in FIG. 7.

In the negative electrode formation step, the negative electrode active material layer 34 is formed on both surfaces of the active-material region 40 of the collector 32 (the negative electrode 30 is formed).

In the positive electrode formation step, the positive electrode active material layer 64 is formed on both surfaces of the active-material region 70 of the collector 62 (the positive electrode 60 is formed).

In the stacking step, a negative electrode 30, a separator 50, a positive electrode 60, a separator 50, and a negative electrode 30 are stacked in the stated order and a battery body 20 is formed.

In the assembly step, the negative electrode tab 12 and the positive electrode tab 14 are attached to the non-active-material region (protrusion) 46 of the collector 32 and the non-active-material region (protrusion) 76 of the collector 62, respectively, after which the battery body 20 is disposed between a pair of rectangular laminate films (sheet members).

In the first sealing step, three sides on outer peripheral portions of the laminate films are joined by thermal fusion bonding.

In the liquid injection step, an electrolytic liquid is injected using the one non-joined side of the laminate films.

In the second sealing step, the one non-joined side is subjected to thermal fusion bonding, thereby forming the exterior body 16 inside which the battery body 20 is accommodated in a hermetically sealed state.

The negative electrode formation step is described in more detail below.

Figure 8:
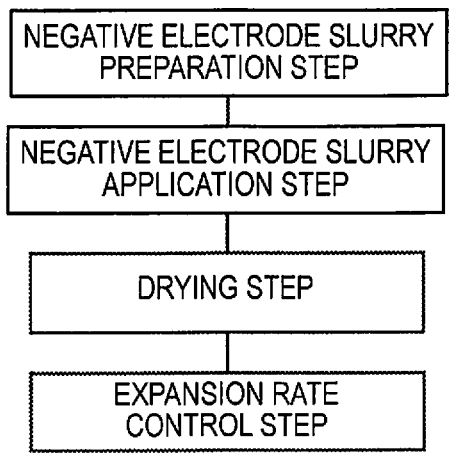
FIG. 8 is a flowchart for illustrating a negative electrode formation step that is shown in FIG. 7.

FIG. 8 is a flowchart for illustrating a negative electrode formation step that is shown in FIG. 7.

The negative electrode formation step has a negative electrode slurry preparation step, a negative electrode slurry application step, a drying step, and an expansion rate control step, as shown in FIG. 8.

In the negative electrode slurry preparation step, a viscosity-adjusting solvent is added to a mixture of components that constitute the negative electrode active material layer, and a negative electrode slurry having a prescribed viscosity is prepared. Examples of the components that constitute the negative electrode active material layer include the particulate negative electrode active material, the binder, and the electroconductivity auxiliary.

In the negative electrode slurry application step, the negative electrode slurry is applied to both surfaces of the collector 32. The method for applying the negative electrode slurry is not particularly limited.

In the drying step, a negative electrode slurry cover layer formed on both surfaces in the shape of the collector 32 is dried using a vacuum oven and the solvent is removed. This forms the negative electrode active material layer 34. The drying temperature is, e.g., 120-130° C.

The negative electrode active material layer 34 is not limited to a state of being formed simultaneously on both surfaces of the collector 32. For example, the negative electrode slurry can be applied to one surface of the collector 32 and dried, and then the negative electrode slurry can be applied to the other surface of the collector 32 and dried, thereby forming the negative electrode active material layer 34 on both surfaces of the collector 32.

In the expansion rate control step, the expansion rate of the non-facing portion 44 is made less than the expansion rate of the facing portion 42. The control of the expansion rate of the non-facing portion 44 is achieved by making the hole ratio in the non-facing portion 44 greater than the hole ratio in the facing portion 42 (forming holes in the non-facing portion 44) (see FIG. 6). The holes in the non-facing portion 44 are formed by removing some of the binder included in the non-facing portion 44. The negative electrode 30 is thereby obtained.

The expansion rate control step is described in more detail below.

Figure 9:
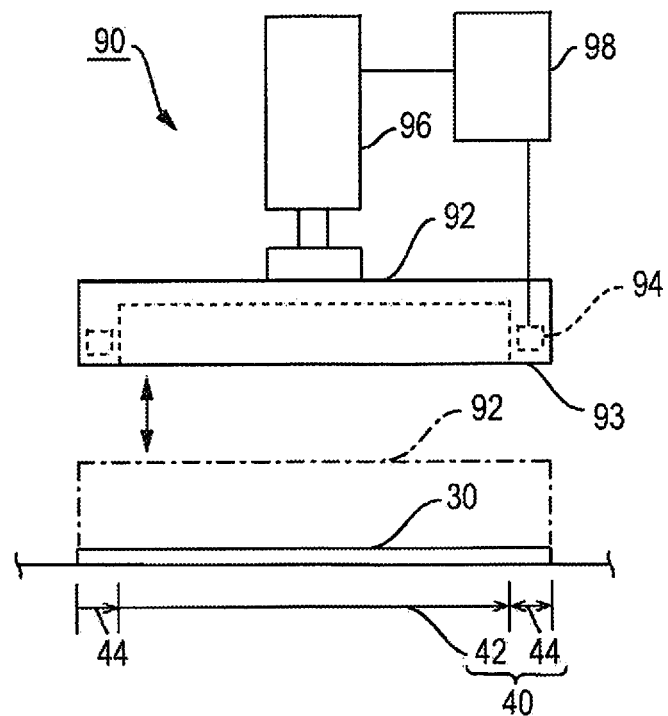
FIG. 9 is a schematic view illustrating a heating apparatus applied in an expansion rate control step shown in FIG. 8.
Figure 10:
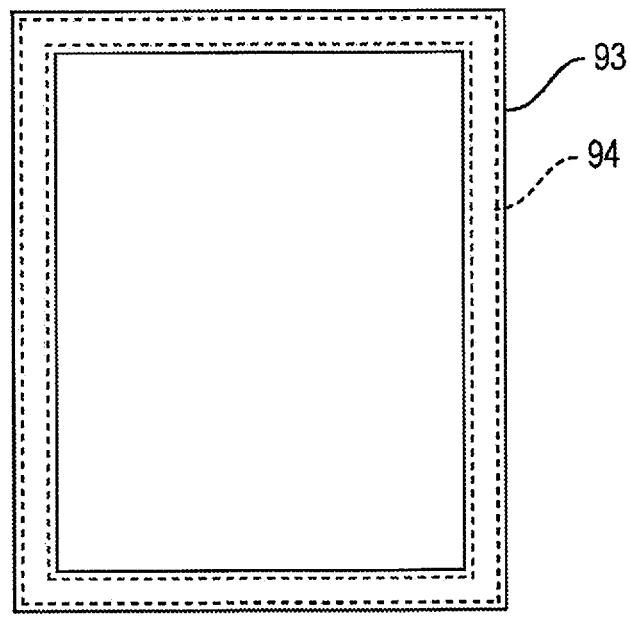
FIG. 10 is a plan view illustrating a localized heating surface of the heating apparatus shown in FIG. 9.

FIG. 9 is a schematic view illustrating a heating apparatus applied in an expansion rate control step shown in FIG. 8, and FIG. 10 is a plan view illustrating a localized heating surface of the heating apparatus shown in FIG. 9.

A rubber-based binder that is an aqueous binder and a water-soluble polymer binder are applied as the binder, and, for example, a heating apparatus 90 shown in FIG. 9 is used to heat the non-facing portion in the expansion rate control step, whereby the water-soluble polymer binder is thermally decomposed and removed. A heating temperature therefor is less than the thermal decomposition temperature of the rubber-based binder, equal to or greater than the thermal decomposition temperature of the water-soluble polymer binder, and greater than the drying temperature in the drying step. For example, in a case where the rubber-based binder and the water-soluble polymer binder are styrene-butadiene rubber and a carboxymethylcellulose-based compound, the heating temperature is 170-200° C. The heating time is, for example, ten seconds, but is not particularly limited and can be set as appropriate.

The heating apparatus 90 has a pressing part 92, a drive device 96, and a control unit 98.

The pressing part 92 has a localized heating surface 93 and a heater 94. The localized heating surface 93 has a substantially rectangular frame shape corresponding to the shape of the non-facing portion 44 of the negative electrode active material layer 34, as shown in FIG. 10. The heater 94 is disposed inside the pressing part 92 and is used to raise the temperature of the localized heating surface 93.

The drive device 96 has, for example, a cylinder or an actuator that is linked to the pressing part 92 and causes the pressing part 92 to move in a reciprocating manner. The drive device 96 is configured to be capable of causing the localized heating surface 93 of the pressing part 92 to abut the non-facing portion 44 of the negative electrode active material layer 34.

The control unit 98 has, for example, a control circuit configured from a microprocessor, etc., that controls various parts and executes a variety of calculation processes in accordance with a program. The control unit 98 is configured so as to control the drive device 96 and the heater 94 of the pressing part 92. For example, the control unit 98 can control the heater 94 and thereby maintain the temperature of the localized heating surface 93 of the pressing part 92 at a prescribed value, or can control the drive device 96 and thereby position the localized heating surface 93 of the pressing part 92 in relation to the non-facing portion 44 of the negative electrode active material layer 34, cause the localized heating surface 93 to abut the non-facing portion 44, and maintain this state for a prescribed time.

Therefore, the heating apparatus 90 can, for example, cause the localized heating surface 93 of the pressing part 92 that is maintained at a temperature of 170-200° C. to abut only the non-facing portion 44 of the negative electrode active material layer 34 and retain this state for ten seconds. Specifically, the heating apparatus 90 can thermally decompose the carboxymethylcellulose-based compound (water-soluble polymer binder) included in the non-facing portion 44, remove said compound, and form holes in the non-facing portion 44.

Because the localized heating surface 93 has a substantially rectangular frame shape corresponding to the shape of the non-facing portion 44, the thermal effect on the facing portion 42 positioned inside the non-facing portion 44 is suppressed. In addition, because the heating temperature of the localized heating surface 93 is less than the thermal decomposition temperature of the rubber-based binder, the thermal effect on the styrene-butadiene rubber (rubber-based binder) included in the non-facing portion 44 is suppressed.

The heater 94 is not limited to being disposed inside the pressing part 92, but rather can be disposed at a position outside of the pressing part 92 and set apart from the negative electrode active material layer 34. The drive device 96 can furthermore have, as necessary, a mechanism for driving the pressing part 92 in a horizontal direction intersecting the direction of reciprocating motion.

In a case where an aqueous binder is applied as the binder, an aqueous solvent is applied as the viscosity-adjusting solvent in the negative electrode slurry preparation step. The aqueous solvent is water, a liquid mixture of water and an alcohol, etc. Examples of the water include pure water, ultrapure water, distilled water, ion-exchange water, groundwater, well water, and clean water (tap water). Examples of the alcohol include ethyl alcohol, methyl alcohol, and isopropyl alcohol.

A modification is described below.

Figure 11:
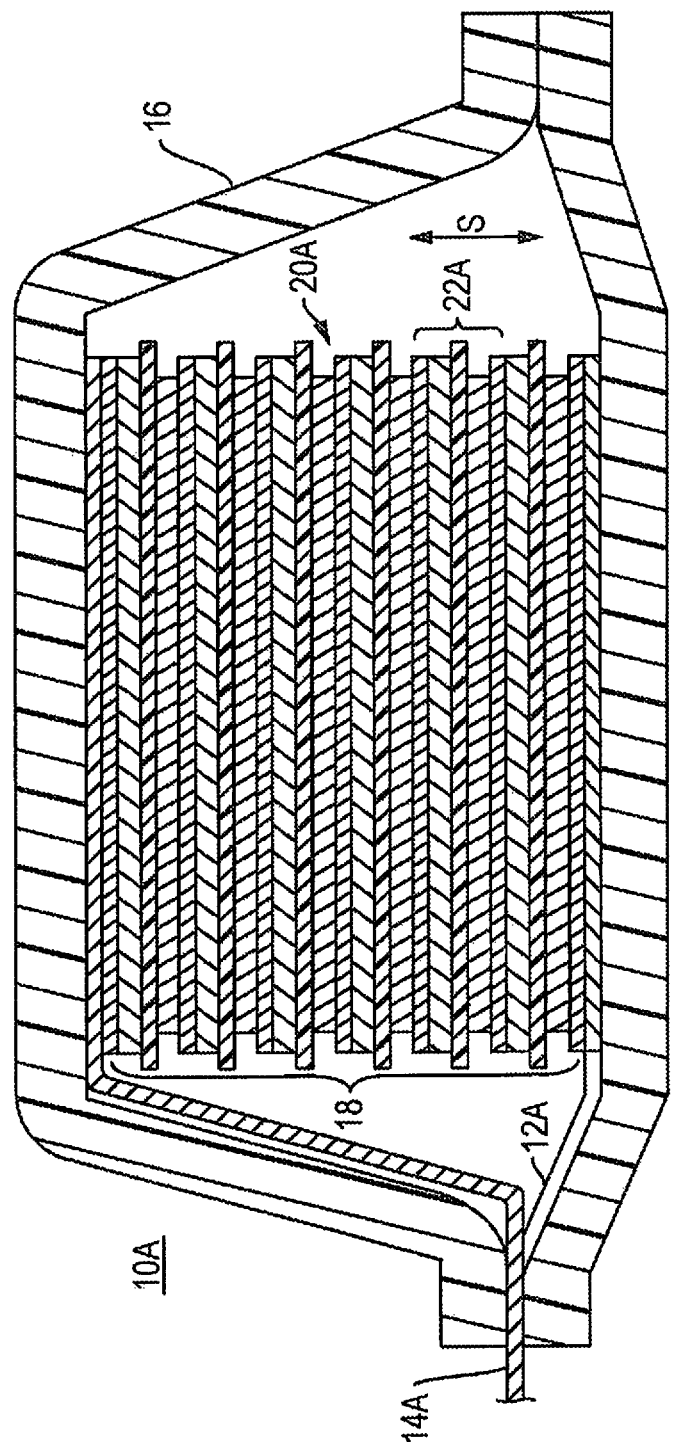
FIG. 11 is a sectional view illustrating a modification according to an embodiment of the present invention.
Figure 12:
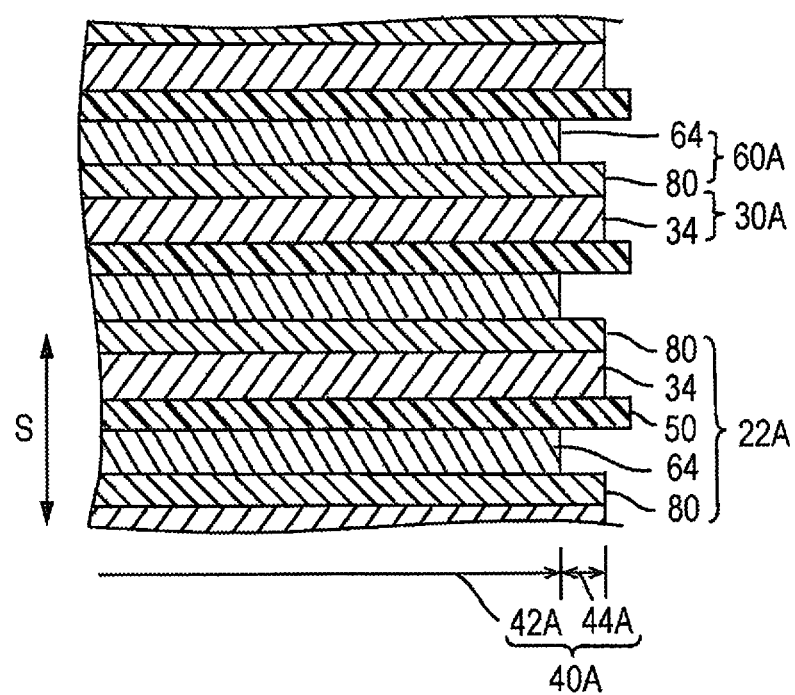
FIG. 12 is a sectional view illustrating a power generation element shown in FIG. 11.

FIG. 11 is a sectional view illustrating a modification according to an embodiment of the present invention, and FIG. 12 is a sectional view illustrating a power generation element shown in FIG. 11.

The embodiments of the present invention are not limited to the non-bipolar lithium-ion secondary battery 10; for example, the embodiments can be applied to a bipolar lithium-ion secondary battery 10A shown in FIG. 11. Descriptions of members having the same function as the members of the secondary battery 10 are omitted to avoid repetition.

The secondary battery 10A has a negative electrode tab 12A, a positive electrode tab 14A, and an exterior body 16, as shown in FIG. 11. The exterior body 16 has disposed therein a battery body 20A and a seal part (not shown). The negative electrode tab 12A and the positive electrode tab 14A are disposed outside the battery body 20A and are configured so as to at least cover the entirety of an electrode projection surface.

The battery body 20A has a negative electrode active material layer 34, a separator 50, a positive electrode active material layer 64, and a collector 80, as shown in FIG. 12. The negative electrode active material layer 34 is disposed on one surface of the collector 80, and the positive electrode active material layer 64 is disposed on the other surface of the collector 80. The negative electrode active material layer 34 and the collector 80 constitute a negative electrode 30A, and the positive electrode active material layer 64 and the collector 80 constitute a positive electrode 60A. Specifically, the collector 80 is a bipolar collector shared by the negative electrode 30A and the positive electrode 60A.

The separator 50 is disposed between the negative electrode active material layer 34 and the positive electrode active material layer 64. Therefore, the collector 80 on which the negative electrode active material layer 34 is disposed, the negative electrode active material layer 34, the separator 50, and the positive electrode active material layer 64 and the collector 80 on which the positive electrode active material layer 64 is disposed constitute a power generation element (unit cell) 22A. Power generation elements 22A are stacked and electrically connected in series.

A configuration is adopted such that the area of the negative electrode active material layer 34 is greater than the area of the positive electrode active material layer 64. Therefore, an active-material region 40A in the collector where the negative electrode active material layer 34 is disposed has a facing portion 42A that faces the positive electrode active material layer 64, interposed by the separator 50, and a non-facing portion 44A that is positioned on an outer periphery of the facing portion 42A (so as to surround the facing portion 42A) and does not face the positive electrode active material layer 64 (see FIG. 12).

A configuration is adopted such that the hole ratio in the non-facing portion 44A is greater than the hole ratio in the non-facing portion 42A and the expansion rate of the non-facing portion 44A is less than the expansion rate of the facing portion 42A. Specifically, in the present modification as well, because the expansion rate of the non-facing portion 44A is less than the expansion rate of the facing portion 42A, stress acting on the non-facing portion 44A is reduced during expansion and contraction of the negative electrode active material layer (during charging and discharging) to a greater extent than in a case where the expansion rate of the non-facing portion 44A and the expansion rate of the facing portion 42A are the same. Therefore, wrinkling in an outer peripheral edge portion of the negative electrode 30A at which the non-facing portion 44A is positioned is suppressed.

In FIG. 11, the collector 80 positioned at an uppermost layer does not have a positive electrode active material layer 64, and the collector 80 positioned at a lowermost layer does not have a negative electrode active material layer 34. This is because a positive electrode active material layer 64 and a negative electrode active material layer 34 positioned outside of the collectors 80 that are positioned at the uppermost layer and the lowermost layer would not contribute to a battery reaction. However, a configuration can be adopted, as necessary, such that the collectors 80 have a bipolar electrode structure.

The seal part is disposed so as to surround the periphery of the positive electrode active material layer 64 and the negative electrode active material layer 34 and is provided in order to seal at least part of the outer peripheral portion of the power generation elements 22A. The seal part can also be omitted as appropriate in accordance with the configuration of the electrolyte (electrolytic liquid).

In the present embodiment as described above, because the modification of the stacking direction of the facing portion is restricted by the positive electrode active material layer, the collector, and the electrolyte layer, expansion and contraction of the facing portion is suppressed, but because the modification of the stacking direction of the non-facing portion is not restricted, expansion and contraction of the non-facing portion is not suppressed. However, because the expansion rate of the non-facing portion is less than the expansion rate of the facing portion, stress acting on the non-facing portion is reduced during expansion and contraction of the negative electrode active material layer (during charging and discharging) to a greater extent than in a case where the expansion rate of the non-facing portion and the expansion rate of the facing portion are the same. Therefore, wrinkling in the outer peripheral edge portion of the negative electrode at which the non-facing portion is positioned is suppressed. Specifically, it is possible to provide a secondary battery in which wrinkling in an outer peripheral edge portion of a negative electrode that is caused by expansion and contraction of a negative electrode active material layer can be suppressed.

In a case where the hole ratio of the non-facing portion is greater than the hole ratio of the facing portion, it is possible to ensure that the amount of space contained within the negative electrode active material being expanded is greater in the non-facing portion than in the facing portion, and therefore the expansion rate will decrease. Specifically, controlling the hole ratio makes it possible to readily achieve a configuration in which the expansion rate of the non-facing portion is made less than the expansion rate of the facing portion.

The hole ratio in the non-facing portion can be increased by removing the binder included in the non-facing portion. In this case, the weight of the binder per unit volume in the non-facing portion will be less than the weight of the binder per unit volume in the facing portion.

The binder is preferably an aqueous binder in which water is a solvent or a dispersion medium. With an aqueous binder, not only is water readily procured as a raw material, but also water vapor is generated during drying. Therefore, the aqueous binder is preferred because it is possible to greatly reduce capital investment in a production line and also to reduce environmental burden. In addition, the aqueous binder preferably includes a rubber-based binder and a water-soluble polymer binder. This is because the rubber-based binder is preferred from the standpoint of bonding properties and the water-soluble polymer binder is preferred from the standpoint of coating properties.

In a case where the thermal decomposition temperature of the rubber-based binder is higher than the thermal decomposition temperature of the water-soluble polymer binder, the water-soluble polymer binder is thermally decomposed in a selective manner and is readily removed from the non-facing portion. In this case, the weight of the water-soluble polymer binder per unit volume in the non-facing portion will be less than the weight of the water-soluble polymer binder per unit volume in the facing portion.

A carboxymethylcellulose-based compound is particularly suitable as the water-soluble polymer binder from the standpoint of coating properties.

Styrene-butadiene rubber is particularly suitable as the rubber-based binder from the standpoint of bonding properties.

The negative electrode active material layer preferably has a silicon-containing negative electrode active material. In this case, it is possible to increase the capacity of the secondary battery. It is easy to apply a silicon-containing negative electrode active material having a high expansion rate because wrinkling in the outer peripheral edge portion of the negative electrode where the non-facing portion is positioned is suppressed.

The present invention is not limited to the embodiments described above; various changes and modifications can be made without departing from the scope of the invention as defined in the appended claims. For example, the secondary battery is not limited to being a stacked secondary battery; the present invention can also be applied to a wound secondary battery. In addition, the secondary battery can be used independently, but it is also possible to use an assembled battery in which secondary batteries are connected in series and/or in parallel.

The method for making the hole ratio in the non-facing portion greater than the hole ratio in the facing portion is not limited to selective heating of the non-facing portion. For example, the hole ratio in the non-facing portion can be made greater than the hole ratio in the facing portion by selectively pressing the facing portion and eliminating holes present in the facing portion. Alternatively, the hole ratio in the non-facing portion can be made greater than the hole ratio in the facing portion by causing the binder forming the holes to differ in coating amount or concentration between the non-facing portion and the facing portion.

The invention claimed is:

1. A secondary battery comprising:
   a power generation element including a positive electrode having a collector on which a positive electrode active material layer is disposed, an electrolyte layer for retaining an electrolyte, and a negative electrode having a collector on which a negative electrode active material layer is disposed, the negative electrode active material layer having an area greater than that of the positive electrode active material layer;
   the positive electrode active material layer and the negative electrode active material layer facing each other with the electrolyte layer interposed therebetween;
   the negative electrode active material layer having a facing portion that faces the positive electrode active material layer with the electrolyte layer interposed therebetween, and a non-facing portion that is positioned on an outer periphery of the facing portion and does not face the positive electrode active material layer; and
   a stretching rate of the non-facing portion being less than a stretching rate of the facing portion, the stretching rate being a volume increase rate in volume per unit of the negative electrode active material layer during charging and discharging,
   the negative electrode active material layer having holes; and
   a rate of holes in the non-facing portion of the negative electrode active material layer being greater than a rate of holes in the facing portion of the negative electrode active material layer.

2. The secondary battery according to claim 1, wherein
   the negative electrode active material layer has a binder; and
   a weight of the binder per unit volume of the negative electrode active material layer in the non-facing portion is less than a weight of the binder per unit volume of the negative electrode active material layer in the facing portion.

3. The secondary battery according to claim 2, wherein
   the binder is an aqueous binder in which water is a solvent or a dispersion medium, and the binder includes a rubber-based binder and a water-soluble polymer binder; and
   the weight of the water-soluble polymer binder per unit volume of the negative electrode active material layer in the non-facing portion is less than the weight of the water-soluble polymer binder per unit volume of the negative electrode active material layer in the facing portion.

4. The secondary battery according to claim 3, wherein
   a thermal decomposition temperature of the rubber-based binder is higher than a thermal decomposition temperature of the water-soluble polymer binder.

5. The secondary battery according to claim 3, wherein
   the water-soluble polymer binder is a carboxymethylcellulose-based compound.

6. The secondary battery according to claim 3, wherein
   the rubber-based binder is styrene-butadiene rubber.

7. The secondary battery according to claim 1, wherein
   the negative electrode active material layer has a silicon-containing negative electrode active material.

8. A secondary battery manufacturing method comprising:
   an assembly step comprising providing a power generation element including a positive electrode having a collector on which a positive electrode active material layer is disposed, an electrolyte layer for retaining an electrolyte, and a negative electrode having a collector on which a negative electrode active material layer is disposed, the negative electrode active material layer having an area greater than that of the positive electrode active material layer, the positive electrode active material layer and the negative electrode active material layer facing each other with the electrolyte layer interposed therebetween, and the negative electrode active material layer having a facing portion that faces the positive electrode active material layer, interposed by the electrolyte layer, and a non-facing portion that is positioned on an outer periphery of the facing portion and does not face the positive electrode active material layer, and
   a stretching rate control step comprising forming holes in the negative electrode active material layer such that a rate of holes in the non-facing portion of the negative electrode active material layer is greater than a rate of holes in the facing portion of the negative electrode active material layer.

9. The secondary battery manufacturing method according to claim 8, wherein
   the negative electrode active material layer has a binder; and
   the holes are formed by removing some of the binder included in the non-facing portion in the stretching rate control step.

10. The secondary battery manufacturing method according to claim 9, wherein
    the binder is an aqueous binder in which water is a solvent or a dispersion medium, and the binder includes a rubber-based binder and a water-soluble polymer binder; and
    the water-soluble polymer binder is removed in the stretching rate control step.

11. The secondary battery manufacturing method according to claim 10, wherein
    a thermal decomposition temperature of the rubber-based binder is higher than a thermal decomposition temperature of the water-soluble polymer binder; and the non-facing portion of the negative electrode active material layer is heated at a temperature that is less than the thermal decomposition temperature of the rubber-based binder and equal to or greater than the thermal decomposition temperature of the water-soluble polymer binder in the stretching rate control step to thermally decompose and remove the water-soluble polymer binder.

12. The secondary battery manufacturing method according to claim 10, wherein
the water-soluble polymer binder is a carboxymethylcellulose-based compound.

13. The secondary battery manufacturing method according to claim 8, wherein
the rubber-based binder is styrene-butadiene rubber.

14. The secondary battery manufacturing method according to claim 8, wherein
the negative electrode active material layer has a silicon-containing negative electrode active material.

* * * * *